US012799366B2

(12) United States Patent
Luo et al.

(10) Patent No.: US 12,799,366 B2
(45) Date of Patent: Nov. 17, 2026

(54) METHOD OF BRANCHING POLYMERIZATION INDUCED BY CHAIN-TRANSFER REACTION

(71) Applicant: The Hong Kong University of Science and Technology, Hong Kong (CN)

(72) Inventors: Zhengtang Luo, Hong Kong (CN); Alexander Perez Roxas, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 731 days.

(21) Appl. No.: 18/324,287

(22) Filed: May 26, 2023

(65) Prior Publication Data

US 2023/0383143 A1 Nov. 30, 2023

Related U.S. Application Data

(60) Provisional application No. 63/346,330, filed on May 27, 2022.

(51) Int. Cl.

| | |
|---|---|
| ***C08F 2/46*** | (2006.01) |
| ***C08F 2/26*** | (2006.01) |
| ***C08F 2/38*** | (2006.01) |
| ***C08F 2/50*** | (2006.01) |
| ***C08F 222/32*** | (2006.01) |
| ***C08G 61/04*** | (2006.01) |
| ***C09J 4/00*** | (2006.01) |

(52) U.S. Cl.

CPC *C09J 4/00* (2013.01); *C08F 2/26* (2013.01); *C08F 2/38* (2013.01); *C08F 222/322* (2020.02); *C09J 2301/30* (2020.08); *C09J 2433/00* (2013.01)

(58) Field of Classification Search

CPC ...... C08F 2/02; C08F 2/26; C08F 2/38; C08F 222/326; C08F 222/322; C08F 222/328; C08F 122/32; C09J 4/00; C09J 135/04; C09J 2301/30; C09J 2335/04; C09J 2433/00; C08L 35/04

USPC ......... 522/152, 151, 150, 1, 71, 6, 189, 184; 520/1

See application file for complete search history.

(56) References Cited

U.S. PATENT DOCUMENTS 4,845,151 A * 7/1989 Sivy ........................... C09J 4/00 524/762
5,652,280 A * 7/1997 Kutal ...................... G03F 7/029 522/170
9,603,868 B1 * 3/2017 Kennedy .............. A61K 31/785
2007/0255403 A1 * 11/2007 Pinchuk ................ A61F 2/1616 523/105
2015/0328357 A1 11/2015 Kennedy

FOREIGN PATENT DOCUMENTS

WO WO-2015145175 A1 * 10/2015 ............. C08C 19/28

OTHER PUBLICATIONS

Roxas, A.P., et al., "Rapid, Controlled Branching Polymerization of Cyanoacrylate via Pathway-Enabled, Site-Specific Branching Initiation", Macromolecular Rapid Communications, 2025, 46(2400658): 1-9.

* cited by examiner

*Primary Examiner* — Jessica Whiteley
(74) *Attorney, Agent, or Firm* — SALIWANCHIK, LLOYD & EISENSCHENK

(57) ABSTRACT

The subject invention pertains to a method of forming an adhesive material by a branching polymerization free of restrictive or harsh reaction conditions. A readily polymerizable composition includes a component comprises a chain-transfer functionality that can induce the formation of branches upon polymerization of the composition. The method enables in-situ polymerization and surface-initiated polymerization useful for rapid adhesive material formation on surfaces such as biological tissue.

14 Claims, No Drawings

METHOD OF BRANCHING POLYMERIZATION INDUCED BY CHAIN-TRANSFER REACTION

CROSS-REFERENCE TO RELATED APPLICATION

This application claims the benefit of U.S. Provisional Application Ser. No. 63/346,330, filed May 27, 2022, which is hereby incorporated by reference in its entirety including any tables, Figures, or drawings.

FIELD OF THE INVENTION

The present invention generally relates to branching polymerization and more particularly to a method of rapid branching polymerization without restrictive or harsh reaction conditions.

BACKGROUND OF THE INVENTION

Cyanoacrylates are highly reactive monomers whose anionic polymerization is spontaneously initiated by nucleophiles, like water, amines, and bases, and progresses with high propagation rate and high monomer conversion, without strictly abiding by the harsh reaction conditions in most polymerization methods. The resulting polymeric materials typically consist of linear chains having high, broadly distributed molecular weights, demonstrating a lack of control over polymerization. Synthetic advances involving the polymerization of cyanoacrylate are severely restricted by this high monomer reactivity, which in more recent methods are deliberately suppressed by using inhibitors to enable the synthesis of other polymer topologies. Several practical drawbacks exist, however, because during these recent methods undergo a free-radical mechanism, thereby requiring stringent reaction conditions like inert atmosphere, metal catalysis, heat application, or ultraviolet irradiation. The resulting polymerization is relatively slow and requires post-polymerization purification or processing.

However, the high monomer reactivity is the primary reason for the widespread use of cyanoacrylate, most especially as fast-acting adhesives, whereby nucleophiles on surfaces initiate the polymerization and form covalent bonds between the surfaces and the polymerized adhesive film. As a result, the majority of the existing polymerization methods of cyanoacrylate are deemed inappropriate or ineffective in many of its well-known applications in repair, upholstery, manufacturing, and biomedicine. In view of the increasing demands on new features for advanced applications, the options of polymerization methods must be expanded to synthesizing other polymer topologies, without sacrificing practicality.

BRIEF SUMMARY OF THE INVENTION

Embodiments are directed to a method of branching polymerization, which includes providing a readily polymerizable composition consisting of the cyanoacrylate and a comonomer with at least one chain-transfer functionality for rapidly initiating the branching polymerization of the polymerizable composition without restrictive or harsh reaction conditions and spontaneously generating a chain-transfer-induced branch during the polymerization reaction, whereby at least one chain-transfer functionality of the comonomer is deprotonated in a chain-transfer reaction, producing at least one more chain-growth site therefrom and converting the comonomer into a branching junction. The method is to a branching polymerization of cyanoacrylates with high propagation rates and high monomer conversions without restrictive or harsh reaction conditions and, therefore, enabling applications, such as in-situ polymerization and surface-initiated polymerization.

Embodiments are directed to a readily polymerizable composition that can be polymerized through the above method including at least one chain growth polymerizable monomer and/or macromonomer with a cyanoacrylate functionality; and at least one chain-growth polymerizable comonomer and/or macro-comonomer that combines a cyanoacrylate functionality and at least one chain-transfer functionality such that, upon exposure to a nucleophile, the polymerizable composition rapidly forms a branched polymeric material. The chain growth polymerizable monomer and/or macromonomer can be, but is not limited to, n-butyl cyanoacrylate, n-hexyl cyanoacrylate, 2-octyl cyanoacrylate, butoxyethyl cyanoacrylate, hexoxyethyl cyanoacrylate, poly(ethylene glycol) cyanoacrylate, poly(lactic acid) cyanoacrylate, poly(glycolic acid) cyanoacrylate, poly(ε-caprolactone) cyanoacrylate, poly(4-hydroxybutyrate) cyanoacrylate, poly(3-hydroxyoctanoate) cyanoacrylate, poly(glycerol sebacate) cyanoacrylate, poly(trimethylene carbonate) cyanoacrylate, and combinations thereof. The chain-growth polymerizable comonomer and/or macro-comonomer, with a cyanoacrylate functionality and at least one chain-transfer functionality, is a carboxy-functional ester of 2-cyanoacrylic acid and can have the structure: $R^1(CR^2R^3)_xO(O)C—C(CN){=}CH_2$ where x is 1 to 12 and $R^1$, $R^2$, and $R^3$ are independently H, C1-C8 alkyl, C1-C8 alkyloxy, phenyl, phenoxy, —$C(O)OR^4$, —$C(O)NR^4R^5$ or —$O(O)C—C(CN){=}CH_2$, and where $R^4$ and $R^5$ are independently H, C1-C8 alkyl, or phenyl, and where any alkyl, alkoxy, phenyl or phenoxy group is optionally substituted one or more times with with a C1-C8 alkyl, C1-C8 alkyloxy, phenyl, phenoxy, —C(O)OH, —$C(O)OR^4$, —$C(O)NR^4R^5$ or —$O(O)C—C(CN){=}CH_2$, and wherein at least one of $R^1$, $R^2$, and $R^3$ comprises —C(O)OH. In the carboxy-functional esters of 2-cyanoacrylic acid is a carboxy-terminated esters of 2-cyanoacrylic acid $HO(O)C(CH_2)_yOC(O)C(CN){=}CH_2$ where y is 2 to 12. The polymerizable composition can include one or more di- or polyfunctional monomers comprising a plurality of cyanoacrylates. The one or more di- or polyfunctional monomers comprising a plurality of cyanoacrylates include but are not limited to poly(ethylene glycol) dicyanoacrylate, poly(lactic acid) dicyanoacrylate, poly(glycolic acid) dicyanoacrylate, poly(ε-caprolactone) dicyanoacrylate, poly(4-hydroxybutyrate) dicyanoacrylate, poly(3-hydroxyoctanoate) dicyanoacrylate, poly(glycerol sebacate) dicyanoacrylate, poly(trimethylene carbonate) dicyanoacrylate.

DETAILED DISCLOSURE OF THE INVENTION

Embodiments are directed to a method of branching polymerization of a polymerizable composition where a chain-growth polymerizable monomer and/or macromonomer is included with another chain-growth polymerizable comonomer and/or macro-comonomer with a cyanoacrylate functionality and at least one chain-transfer functionality for the in-situ formation of polymer branches during the polymerization reaction. The polymerizable composition includes: one or more reactive monomers and/or macromonomers; one or more reactive comonomer and/or macromonomer with a chain-transfer functionality; and, optionally, one or more di- or polyfunctional monomers and/or macromonomers. The polymerizable composition can range from relatively non-viscous liquids with relatively little or no macromonomer through readily flowing liquids with moderate viscosity having greater macromonomer content. In general, all components of the polymerizable composition are capable of participating in a branching polymerization with high propagation rate and high monomer conversion without the need of restrictive or harsh reaction conditions.

In embodiments the method of branching polymerization is based upon the reactivity of the comonomer toward both addition in a chain-growth polymerization and deprotonation in a chain-transfer reaction, with which the comonomer may be converted into a branching junction after both reactions have occurred in the same comonomer molecule. By the inclusion of the comonomer with the chain-transfer functionality in the polymerizable composition, the resulting polymeric material can achieve a polymer topology that differs from that of the same composition without the comonomer. Rather than employing complicated mechanisms, for example, systems requiring radical polymerization or with restrictive or harsh conditions, such as inert atmosphere, metal catalysis, heat, or ultraviolet irradiation, the polymerizable composition of the present invention forms polymer chains with branching formed during the anionic polymerization.

The polymerizable composition is characterized by chain-transfer reactions that provide in-situ branching throughout the final polymeric material. In particular, the polymerizable composition is formulated such that the chain-transfer moieties are reactive only with the active anionic chain-ends of a propagating polymer chain or polymerization initiating moieties. Because of the chain-transfer functionality within the comonomer, formation of a branch can occur from the chain-transfer functionality when either the comonomer that has been included along the chain is deprotonated to subsequently generate a new chain-growth site, or the deprotonated carboxylic acid moiety of the comonomer, before or after initiating a new chain of polymerization therewith, is included along a propagating chain. The chain-transfer site for initiation of the branch formation can be a functionality on a pendant group of any other propagating or non-propagating chain of the forming polymeric material.

In embodiments, the chain growth polymerizable monomer and/or macromonomer can be one or more mono-cyanoacrylates including, but not limited to, n-butyl cyanoacrylate, n-hexyl cyanoacrylate, 2-octyl cyanoacrylate, butoxyethyl cyanoacrylate, hexoxyethyl cyanoacrylate, poly (ethylene glycol) cyanoacrylate, poly(lactic acid) cyanoacrylate, poly(glycolic acid) cyanoacrylate, poly(F-caprolactone) cyanoacrylate, poly(4-hydroxybutyrate) cyanoacrylate, poly(3-hydroxyoctanoate) cyanoacrylate, poly(glycerol sebacate) cyanoacrylate, poly(trimethylene carbonate) cyanoacrylate, and combinations thereof. The proportion of any combinations are selected such by one skilled in the art to achieve a desired viscosity of the adhesive composition and to achieve a material upon polymerization that has a desired property.

In embodiments, the chain-growth polymerizable comonomer and/or macro-comonomer with a cyanoacrylate functionality and at least one chain-transfer functionality can be carboxy-functional esters of 2-cyanoacrylic acid. The chain-transfer reaction deprotonates the carboxylic acid functionality of the comonomer, thereby forming a conjugate base within the same molecule. This carboxylate conjugate base adds to a cyanoacrylate functionality to initiate a new propagating polymer chain. If the cyanoacrylate functionality of the comonomer has been added into a polymer chain, this new propagating polymer chain generates a newly formed branch. If the cyanoacrylate functionality of the comonomer has not yet been added into a polymer chain, the new propagating polymer chain becomes a branch when the cyanoacrylate functionality from the comonomer adds into a polymer chain. For example, the carboxy-functional esters of 2-cyanoacrylic acid can have the structure: $R^1(CR^2R^3)_xO(O)C—C(CN)═CH_2$ where x is 1 to 12 and $R^1$, $R^2$, and $R^3$ are independently H, C1-C8 alkyl, C1-C8 alkyloxy, phenyl, phenoxy, —C(O)OR$^4$, —C(O)NR$^4$R$^5$ or —O(O)C—C(CN)═$CH_2$, and where any alky, alkoxy, phenyl or phenoxy group is optionally substituted one or more times with a C1-C8 alkyl, C1-C8 alkyloxy, phenyl, phenoxy, —C(O)OH, —C(O)OR$^4$, —C(O)NR$^4$R$^5$ or —O(O)C—C(CN)═$CH_2$, where $R^4$ and $R^5$ are independently H, C1-C8 alkyl, or phenyl, and wherein at least one of $R^1$, $R^2$, and $R^3$ comprises —C(O)OH. In an embodiment the carboxy-functional esters of 2-cyanoacrylic acid is $HO(O)C(CH_2)_yOC(O)C(CN)═CH_2$ where y is 2 to 12.

Optionally, in embodiments of the invention, one or more di- or polyfunctional macromonomers are included in the polymerizable composition that are di- or poly cyanoacrylates for formation of branches, and/or crosslinking sites. These macromonomers include but are not limited to poly (ethylene glycol) dicyanoacrylate, poly(lactic acid) dicyanoacrylate, poly(glycolic acid) dicyanoacrylate, poly(F-caprolactone) dicyanoacrylate, poly(4-hydroxybutyrate) dicyanoacrylate, poly(3-hydroxyoctanoate) dicyanoacrylate, poly(glycerol sebacate) dicyanoacrylate, poly(trimethylene carbonate) dicyanoacrylate, and combinations thereof. The inclusion of the di- or poly cyanoacrylates and the proportion thereof allows one skilled in the art to achieve a desired viscosity of the adhesive composition and to achieve a material, which upon polymerization has a desired property.

In embodiments, the polymerizable composition is in the form of a low viscosity liquid that can be used as an adhesive material composition that, when placed into contact with one or more surfaces, initiates a rapid polymerization reaction that forms a film bonded to one or more surfaces by one or more covalent bonds. The adhesive material composition contains carboxylic acid moieties that allow chain-transfer reactions to occur during the polymerization process and generate polymer branch chains during propagation between initiation and terminating reactions, and where, because of branching and cross-linking, a strong adhesive material results with many sites of attachment to the surfaces. The above surfaces include glass, metal, plastics, biological tissues, and similar materials.

In embodiments, the polymerizable composition can include a filler, such that the filler is not an initiator of the chain growth polymerization. The filler can be a glass, plastic, metal, ceramic or any other material that is inherently, or has been rendered inert to the polymerization composition, wherein the filler is soluble or insoluble but of sufficiently small dimensions such that the polymerizable composition is a solution of a suspension.

In an embodiment of the invention, the polymerizable composition can be applied to a substrate surface, such as a tissue surface, whereby the rapid formation of the adhesive material on the surface occurs when an essentially anhydrous adhesive material composition is placed on the surface for the initiation of a chain-growth polymerization. The surface can include water, small or large molecules comprising hydroxy, carboxylic acid, and/or other functionality that can be in the form a base to act as an initiator of the polymerization of the adhesive material composition. For example, but not limited to, the conjugate base of water or other functionality of the surface to be adhered, can initiate the anionic polymerization of the cyanoacrylate functionality in the adhesive material composition. The initiator can be added, or can be inherent to the surface, for example, water or functionality on proteins, sugars, or lipids on and within a tissue surface. The adhesive material composition further undergoes protonation of propagating poly(cyanoacrylate) chains with formation of conjugate bases of the carboxylic acid functionality of the comonomer, wherein these carboxylate conjugate bases add to a cyanoacrylate functionality within the adhesive material composition to initiate new propagating polymer chains. Because the comonomer contains a cyanoacrylate functionality, these new propagating polymer chains may have already been included or may be eventually included into another polymer chain, thereby becoming new branches.

The adhesive material is a fluid of an acceptable viscosity that readily flows onto the surface of biological tissue, such as that of a human, animal, or plant. The adhesive material composition can be applied from a tube, a syringe, or any container that isolates the adhesive material composition from air or any moisture or base containing media until contacted with the intended tissue surface(s).

The following definitions are useful for interpreting terms applied to features of the embodiments disclosed herein and are meant only to define elements within the disclosure.

As used herein, the term "tissue surface" refers to the surface of a biological tissue that contains nucleophiles (e.g., hydroxy or amine groups) on the surface, which are capable of initiating the adhesion of the adhesive material.

As used herein, the term "rapid" when describing the polymerization by which the polymerizable composition converts from a liquid into an effective non-flowable solid refers to the time elapsed after contacting the polymerizable composition with polymerization initiator ranging from less than one second up to about five minutes.

As used herein, the term "film" when describing the adhesive material refers to a solid with a major cross-sectional area that is considerably larger than the thickness as defined by the two perpendicular surfaces.

As used herein, the term "propagation" or "growth" when describing the polymerization process refers to an active polymer chain increasing in length by the addition of monomers and/or macromonomers.

Because the adhesive material can be used in biomedical applications, the monomers or macromonomers used in the present invention are preferably biocompatible. According to embodiments, one or more reactive monomers can be of a low molecular weight, for example, n-butyl cyanoacrylate, n-hexyl cyanoacrylate, and 2-octyl cyanoacrylate.

EXAMPLES

Materials and Methods

Following are examples that illustrate procedures for practicing embodiments of the invention. These examples should not be construed as limiting. All percentages are by weight and all solvent mixture proportions are by mole unless otherwise noted.

Synthesis of Carboxy-Terminated Esters of 2-Cyanoacrylic Acid (Chain-Transfer Agent)

To prepare the chain-transfer agent, F-caprolactone (10.0 g, 87.6 mmol) was added dropwise to a solution of NaOH (3.9 g, 96.5 mmol) in water (170 mL). The mixture was stirred at room temperature overnight and acidified with hydrochloric acid to a pH of 3. The product was extracted from the aqueous mixture using ethyl acetate (3×130 mL), and the extract solution was dried with anhydrous sodium sulfate and concentrated in vacuum to afford 6-hydroxyhexanoic acid as a colorless oil. The oil was charged into a solution of benzyl bromide (26.4 g, 154.6 mmol) and triethylamine (31 mL) in dichloromethane (150 mL). The mixture was washed with saturated aqueous solution of ammonium chloride (2×80 mL), dried with anhydrous sodium sulfate, and purified through column chromatography to obtain benzyl 6-hydroxyhexanoate as a colorless liquid. The product was added to 11-cyano-9,10-dihydro-9,10-ethanoanthracene-11-carboxylic acid (20.3 g, 73.8 mmol), 1-Ethyl-3-(3'-dimethylaminopropyl)carbodiimide hydrochloride (14.2 g, 74.1 mmol), and 4-dimethylaminopyridine (1.9 g, 15.4 mmol) dissolved in dichloromethane (2 L). The resulting solution was stirred at room temperature overnight and washed with saturated aqueous solutions of $NaHCO_3$ (750 mL) and NaCl (750 mL) and 10% aqueous solution of citric acid (750 mL). The solution was dried with anhydrous sodium sulfate and purified through column chromatography to afford 6-(benzyloxy)-6-oxohexyl 11-cyano-9,10-dihydro-9,10-ethanoanthracene-11-carboxylate. A solution of the solid in ethyl acetate (600 mL) was added with palladium on activated carbon catalyst (10% by weight, 3 g) and reacted in a hydrogen atmosphere at room temperature overnight. The solution was separated from the catalyst by filtration and concentrated in vacuum to obtain 5-carboxypentyl 11-cyano-9,10-dihydro-9,10-ethanoanthracene-11-carboxylate as a colorless oil. Finally, a mixture of the oil, maleic anhydride (23.0 g, 234.8 mmol), hydroquinone (30 mg), and phosphorus pentoxide (60 mg) in xylene (300 mL) was refluxed for 8 hours. The solution was concentrated in vacuum and redissolved in toluene (180 mL) three times before filtering out the solids. After removing the solvent in vacuum, the residue was reprecipitated with ethyl acetate and hexane. The solvent was removed in vacuum to obtain 5-carboxypentyl cyanoacrylate.

Preparation of Poly(2-Octyl Cyanoacrylate) with Linear Topology

In a representative experiment, Entry 1 (Table 1) was prepared by combining and thoroughly mixing the initiator triethylamine (0.5 μL, 3.59 μmol) and 2-octyl cyanoacrylate (187.56 mg, 0.90 mmol). The sample, initially in liquid form, quickly converts into a polymerized film. The polymer was purified by precipitation from a dichloromethane solution into methanol and drying the precipitate at 60° C. overnight. A small portion of the sample was dissolved in $CDCl_3$ for $^1H$ NMR analysis. The resulting NMR spectrum indicates that polymerization occurs at high conversion. Its number-average molar mass ($M_{n,SEC}$) and molar mass dispersity (PDI) were determined by size-exclusion chromatography.

Preparation of Poly(2-Octyl Cyanoacrylate) with Branched Topology Using 5-Carboxypentyl Cyanoacrylate as Chain-Transfer Agent A representative sample, Entry 2 (Table 1) was prepared by combining and mixing 2-octyl cyanoacrylate (187.56 mg, 0.90 mmol) and 5-carboxypentyl cyanoacrylate (2.26 mg, 0.01 mmol) in a vial. As initiator, triethylamine, (0.5 μL, 3.59 μmol) was rapidly added to the solution for polymerization. The initial liquid quickly formed a polymer film. For further analysis, the polymer was purified by precipitation from a dichloromethane solution into methanol and drying at 60° C. overnight. A small portion of the sample was dissolved in $CDCl_3$ for $^1H$ NMR analysis. The resulting NMR spectrum indicates that polymerization occurs at high conversion. Number-average molar mass ($M_{n,SEC}$) and molar mass dispersity (PDI) were determined by size-exclusion chromatography and was consistent with a branched polymer through the reduction of the hydrodynamic volume of the polymer due to branching relative to Entry 1.

In Entry 1, no comonomer was added to the monomer mixture. This resulted in a linear polymer with a relatively high molecular weight, which was expected in comparison with the branched polymers. Entries 2-4 show the decreasing molecular weight as more comonomer amount was added. This is caused by the reduction of the hydrodynamic volume of the polymer, suggesting that an increasing degree of branching occurred with higher amount of the comonomer. Entries 5-7 then demonstrate that with the increase in the initiator ratio, as compared to Entries 2-4, the molecular weights further decreased respectively, indicating control in the polymerization.

TABLE 1

Branching polymerization of the 2-octyl cyanoacrylate monomer (1) by simultaneous copolymerization and chain-transfer reaction with 5-carboxylpentyl cyanoacrylate (2) using triethylamine (3) as initiator

| Entry | n(1)/n(2)/n(3) | Time (min) | Conversion (%) | $M_{n,\,SEC}$ (kDa) | PDI |
|---|---|---|---|---|---|
| 1 | 250/0/1 | 5 | >99 | 112.2 | 3.11 |
| 2 | 250/3/1 | 120 | >99 | 24.1 | 3.65 |
| 3 | 250/8/1 | 120 | >99 | 16.1 | 3.54 |
| 4 | 250/15/1 | 120 | >99 | 14.3 | 3.43 |
| 5 | 250/3/10 | 5 | >99 | 6.9 | 3.36 |
| 6 | 250/8/10 | 5 | >99 | 5.3 | 2.96 |
| 7 | 250/15/10 | 5 | >99 | 5.1 | 2.72 |

All patents, patent applications, provisional applications, and publications referred to or cited herein are incorporated by reference in their entirety, including all FIGURES and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

REFERENCES

Bhagat, V., Becker, M. L., Degradable adhesives for surgery and tissue engineering, *Biomacromolecules* 2017, 18, 3009-39.

Martín-Ballestera, A., García-Cerdáa, D., Prieto-Mourea, B., Martín-Martínezc J. M. Lloris-Carsíab, J. M., Use of cyanoacrylate adhesives in dermal lesions: a review, *Journal of Adhesion Science and Technology,* 2013, Petrie, E. M., Cyanoacrylate adhesives in surgical applications: a critical review, *Rev. Adhesion Adhesives,* 2014, 2(3), 253-310.

We claim:

1. A method for forming an adhesive material, comprising:

providing at least one chain growth polymerizable monomer and/or macromonomer comprising a cyanoacrylate;

providing at least one chain transfer agent comprising at least one carboxylic acid moiety and at least one cyanoacrylate functionality;

combining the chain growth polymerizable monomer and/or macromonomer with the chain transfer agent to form a polymerizable composition wherein the polymerizable composition is a fluid; and initiating a branching polymerization within the polymerizable composition by combining with a nucleophile to form the adhesive material.

2. The method according to claim 1, wherein the initiating occurs upon exposure to one or more nucleophiles and thereby forms the adhesive material.

3. The method according to claim 1, wherein the chain growth polymerizable monomer and/or macromonomer is selected from n-butyl cyanoacrylate, n-hexyl cyanoacrylate, 2-octyl cyanoacrylate, butoxyethyl cyanoacrylate, hexoxyethyl cyanoacrylate, poly(ethylene glycol) cyanoacrylate, poly(lactic acid) cyanoacrylate, poly(glycolic acid) cyanoacrylate, poly(E-caprolactone) cyanoacrylate, poly(4-hydroxybutyrate) cyanoacrylate, poly(3-hydroxyoctanoate) cyanoacrylate, poly(glycerol sebacate) cyanoacrylate, poly (trimethylene carbonate) cyanoacrylate, and combinations thereof.

4. The method according to claim 1, wherein the chain transfer agent is a chain-growth polymerizable comonomer and/or macro-comonomer with at least one chain-transfer functionality having a carboxy-functional ester of 2-cyanoacrylic acid of the structure: $R^1(CR^2R^3)_xO(O)C—C(CN){=}CH_2$ where x is 1 to 12 and $R^1$, $R^2$, and $R^3$ are independently H, C1-C8 alkyl, C1-C8 alkyloxy, phenyl, phenoxy, —C(O)$OR^4$, —C(O)$NR^4R^5$ or —O(O)C—C(CN)=$CH_2$ where $R^4$ and $R^5$ are independently H, C1-C8 alkyl, or phenyl, and where any alky, alkoxy, phenyl or phenoxy group is optionally substituted one or more times with a C1-C8 alkyl, C1-C8 alkyloxy, phenyl, phenoxy, —C(O)OH, —C(O)$OR^4$, —C(O)$NR^4R^5$ or —O(O)C—C(CN)=$CH_2$, wherein at least one of $R^1$, $R^2$, and $R^3$ comprises —C(O)OH.

5. The method according to claim 4, wherein the carboxy-functional ester of 2-cyanoacrylic acid is a carboxy-terminated ester of 2-cyanoacrylic acid $HO(O)C(CH_2)_yOC(O)C(CN){=}CH_2$ where y is 2 to 12.

6. The method according to claim 1, further comprising one or more di- or polyfunctional monomers comprising a plurality of cyanoacrylates.

7. The method according to claim 6, wherein the one or more di- or polyfunctional monomers comprising a plurality of cyanoacrylates are selected from poly(ethylene glycol) dicyanoacrylate, poly(lactic acid) dicyanoacrylate, poly(glycolic acid) dicyanoacrylate, poly(ε-caprolactone) dicyanoacrylate, poly(4-hydroxybutyrate) dicyanoacrylate, poly(3-hydroxyoctanoate) dicyanoacrylate, poly(glycerol sebacate) dicyanoacrylate, and poly(trimethylene carbonate) dicyanoacrylate.

8. The method according to claim 1, wherein the nucleophile is a conjugate base of water, a carboxylic acid, or an amine.

9. The method according to claim 1, wherein the nucleophile is on or a portion of a surface.

10. The method according to claim 9, wherein the surface is a biological tissue surface.

11. The method according to claim 9, further comprising applying the polymerizable composition to the surface.

12. The method according to claim 11, wherein applying comprises extruding from a tube or injecting from a syringe.

13. An adhesive material prepared by the method according to claim 9.

14. The adhesive material according to claim 13, wherein the surface is a biological tissue surface.

* * * * *